United States Patent
Tsai

(10) Patent No.: US 9,781,802 B1
(45) Date of Patent: Oct. 3, 2017

(54) ILLUMINATION CORRECTING METHOD AND APPARATUS FOR AT LEAST ONE LIGHT SOURCE BOARD

(71) Applicant: JETEAZY SYSTEM CO., LTD., Hsinchu (TW)

(72) Inventor: Cheng-Hsin Tsai, Hsinchu (TW)

(73) Assignee: JETEAZY SYSTEM CO., LTD., Hsinchu (TW)

( * ) Notice: Subject to any disclaimer, the term of this patent is extended or adjusted under 35 U.S.C. 154(b) by 0 days.

(21) Appl. No.: 15/448,640

(22) Filed: Mar. 3, 2017

(51) Int. Cl.
H05B 33/08 (2006.01)
H05B 37/02 (2006.01)

(52) U.S. Cl.
CPC .............................. *H05B 33/0869* (2013.01)

(58) Field of Classification Search
None
See application file for complete search history.

(56) References Cited

U.S. PATENT DOCUMENTS

| 2006/0061248 | A1* | 3/2006 | Cok | G09G 3/3208 313/110 |
| 2016/0165110 | A1* | 6/2016 | Weng | H04N 5/2256 348/370 |

\* cited by examiner

*Primary Examiner* — Dedei K Hammond
(74) *Attorney, Agent, or Firm* — Bacon & Thomas, PLLC

(57) ABSTRACT

An illumination correcting apparatus capable of adjusting at least one light source board includes a main unit, a calibrating board and an image capturing device. The main unit is electrically connected to the at least one light source board to adjust an illumination value of the at least one light source board, and includes a calculating module. The calculating module chooses one of the at least one light source board to be a target light source board and calculates a correcting illumination value. The calibrating board is disposed in a light emitting path of the light source board. The image capturing device is electrically connected to the main unit to capture an image and transmit the image to the main unit. The main unit calculates the correcting illumination value in accordance with the illumination of the image, distances between the at least one light source board and the calibrating board, and the target illumination value.

7 Claims, 5 Drawing Sheets

ILLUMINATION CORRECTING METHOD AND APPARATUS FOR AT LEAST ONE LIGHT SOURCE BOARD

BACKGROUND OF THE INVENTION

1. Field of the Invention

The present invention relates to an illumination correcting method and apparatus, and more particularly to an illumination correcting method and apparatus for at least one light source board.

2. Description of Related Art

With reference to FIG. 5, a conventional light source board 50, also called a programmable digital controlled light source board, is made of several or hundreds of light emitting modules 501. Each of the light emitting modules 501 is made of multiple light emitting diodes (LEDs). Therefore, each of the light emitting modules 501 is capable of displaying different colors or different illuminations individually. The light source board 50 can be designed in different shapes, such as square, round, polygonal, and so on, depending on customers' demands. The light source board 50 is used in many different fields, such as dynamic display for commercial signs, front light illumination, back light illumination, and so on.

However, when manufacture of the light source board 50 is completed, the illumination in the light emitting modules 501 will not be the same. Therefore, a parameter correction in the light emitting modules 501 of the light source board 50 will be performed before shipping from the manufacturer to equalize the illumination in each of the light emitting modules 501.

When the light source board 50 has been used for a period of time, the illumination of the light emitting modules 501 will be gradually attenuated as time goes by. The original illumination parameters set up by the manufacturer of the light source board 50 are no longer suitable as the reference. When the light emitting modules 501 are in illumination attenuation situation or are damaged because of lifetime, the light emitting modules 501 need to be replaced or corrected. The illumination in the new light emitting module 501 is also different from the overall illumination of the old light emitting module 501 in the light source board 50. Therefore, the original illumination parameters for the light source board 50 are no longer suitable for use and the illumination parameters need to be readjusted. The readjusting for the illumination parameters are highly time consuming.

Accordingly, a need arises to design a new illumination correcting method and apparatus for light source boards to adjust the illumination of light source boards quickly and efficiently.

SUMMARY OF THE INVENTION

An objective of the present invention is to provide an illumination correcting apparatus capable of adjusting at least one light source board and the illumination correcting apparatus can adjust each of the at least one light source board in accordance with an actual illumination of each of the at least one light source board.

According to the aforementioned objective, the illumination correcting apparatus, which is capable of adjusting at least one light source board, includes a main unit, a calibrating board and an image capturing device. The main unit is electrically connected to the at least one light source board to adjust a respective illumination value of each of the at least one light source board, and includes a calculating module selecting one of the at least one light source board to be a target light source board and calculating a correcting illumination value for the target light source board in accordance with a target illumination value. The calibrating board is disposed in a light emitting path of the at least one light source board. The image capturing device is opposite the calibrating board and is electrically connected to the main unit to capture an image reflected from the at least one light source board to the calibrating board and transmit the image to the main unit. The main unit calculates the correcting illumination value in accordance with an illumination of the image, a respective distance between each of the at least one light source board and the calibrating board, and the target illumination value. The target illumination value is an overall illumination value from the at least one light source board emitting light to the calibrating board.

Another objective of the present invention is to develop an illumination correcting method and the illumination correcting method is not required to perform parameter adjusting. The illumination correcting method is to perform a measurement for an actual situation so as to adjust illumination for each of the at least one light source board.

In order to achieve the aforementioned purpose in the present invention, an illumination correcting method capable of adjusting at least one light source board includes steps of: selecting a target light source board from the at least one light source board; measuring a respective distance between each of the at least one light source board and a calibrating board; acquiring an illumination value from each of the at least light source board via a main unit; measuring an actual illumination value on the calibrating board from the at least one light source board via an image capturing device; calculating a correcting illumination value for the target light source board by a calculating module in accordance with a target illumination value, the illumination value, the actual illumination value, and the distance; wherein the target illumination value is an overall illumination value required on the calibrating board from the at least one light source board. The advantage of the present invention is to perform an illumination adjustment for a current illumination of the at least one light source board and the adjustment is accurate without a complicated parameter adjusting.

DETAILED DESCRIPTION OF THE PREFERRED EMBODIMENT

These and other aspects of the embodiments herein will be better appreciated and understood when considered in conjunction with the following description and the accompanying drawings.

Figure 1:
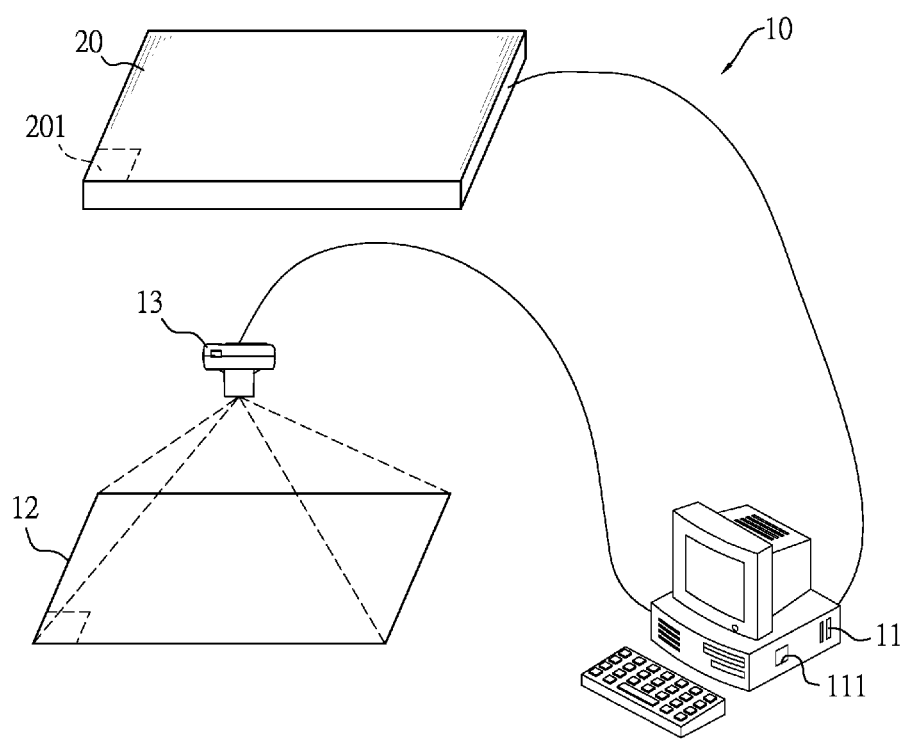
FIG. 1 is a view of an illumination correcting apparatus in the present invention.

With reference to FIG. 1, an illumination correcting apparatus 10 in the present invention includes a main unit 11, a calibrating board 12 and an image capturing device 13. The correcting apparatus 10 is capable of correcting at least one light source board 20. Each of the at least one light source board 20 is a digital light source board and includes a plurality of light emitting modules 201. Each of the light emitting modules 201 is made of a plurality of light emitting diodes (LEDs). The light emitting modules 201 are arranged in an array.

The main unit 11 is a host computer and is electrically connected to the at least one light source board 20 to control illuminations and colors generated by the light emitting modules 201 of the at least one light source board 20. In addition, since the main unit 11 is electrically connected to the at least one light source board 20, the main unit 11 may determine a respective illumination value of each of the at least one light source board 20 in accordance with power consumption and heat generated from each of the at least one light source board 20. In a different embodiment, each of the at least one light source board 20 includes an illumination meter (not shown) that transfers the illumination value to the main unit 11. Alternatively, a user can implement an illumination measuring equipment to measure the respective illumination value of each of the at least one light source board 20 directly. How to measure the illumination value is well known for a person with ordinary skill in the art, and the detailed description is omitted.

The calibrating board 12 is disposed in a transmitting path of light generated from the at least one light source board 20. The light from the at least one light source board 20 is directly or obliquely transmitted. The calibrating board 12 can be disposed at a place within a transmitting range of the light from the at least one light source board 20. The image capturing device 13 can be a digital camera such as a camera with a charge-coupled device (CCD). The image capturing device 13 is opposite the calibrating board 12 and is electrically connected to the main unit 11. The image capturing device 13 is configured to capture an image on the calibrating board 12 and the image is generated by the light from the at least one light source board 20. The image capturing device 13 transfers the image to the main unit 11 to perform an image illumination analysis to obtain an actual illumination value. The main unit 11 calculates a correcting illumination value of one of the at least one light source board 20, which is called a target light source board, in accordance with a target illumination value for all of the at least one light source board 20, the illumination value of the target light source board, and the actual illumination value of the image.

Furthermore, the main unit 11 of the correcting apparatus 10 includes a calculating module 111. The calculating module 111 performs an illumination analysis for the image and calculates a correcting illumination value required for one of the at least one light source board 20 (i.e. the target light source board) in accordance with the target illumination value developed by the correcting apparatus 10. In the present invention, the calculating module 111 implements a target-passing function to calculate the correcting illumination value for the target light source board and the function is:

$$H = H1n + \frac{M - Hn}{L1} * Minitial1 - $$

-continued
$$\frac{\left(\left(H2n + \frac{M-Hn}{L2}\right) + \left(H3n + \frac{M-Hn}{L3}\right) + \ldots + \left(Hnn + \frac{M-Hn}{Ln}\right)\right)}{Minitial2}$$

where H is the correcting illumination value of the target light source board;

H1n, H2n, ..., Hnn are each the respective illumination value of the at least one light source board 20;

M is the target illumination value;

Hn is the actual illumination value of the image captured by the image capturing device 13;

L1, L2, ..., Ln are each the respective distance between the at least one light source board 20 and the calibrating board 12;

Minitial1 is a first constant and Minitial2 is a second constant.

The illumination value in each of the at least one light source board 20 and the distance between each of the at least one light source board 20 and the calibrating board 12 can be measured and inputted by the user in the main unit 11. And then the illumination value and the distances are to be calculated by the calculating module 111.

Figure 2:
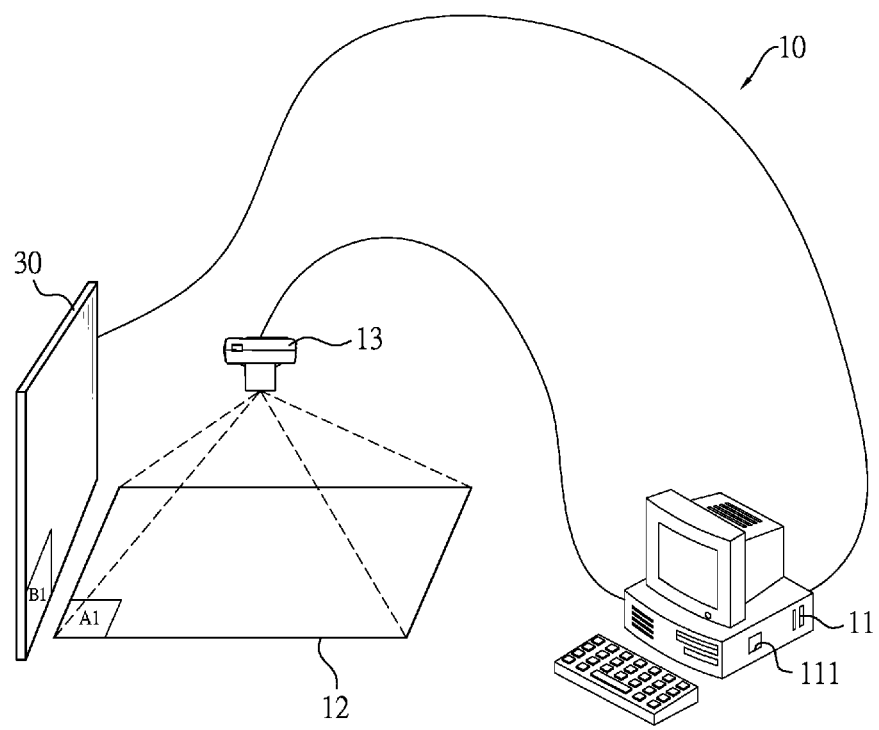
FIG. 2 is a view of an illumination correcting apparatus to correct the at least one light source board in the present invention.

For example, with reference to FIG. 2, only one light source board 30 is disposed at one side of the calibrating board 12 as the target light source board. The image capturing device 13 captures the image from the calibrating board 12 and the actual illumination value of the image is 100. The target illumination value is 150. The light source board 30 is as the target light source board. The target light source board is required to perform the illumination adjustment. The illumination value of the light source board 30 is 120 and is measured by the main unit 11. Alternatively, the illumination value of the light source board 30 may be measured by an illumination measuring equipment, and it is not limited herein. The correcting illumination value of the light source board 30 is: H=120+(150−100)/500*688=188.8. The value 688 is the first constant (Minitial1). Therefore, the illumination value of the light source board 30 is required to be adjusted from 120 to be 188.8.

Figure 3:
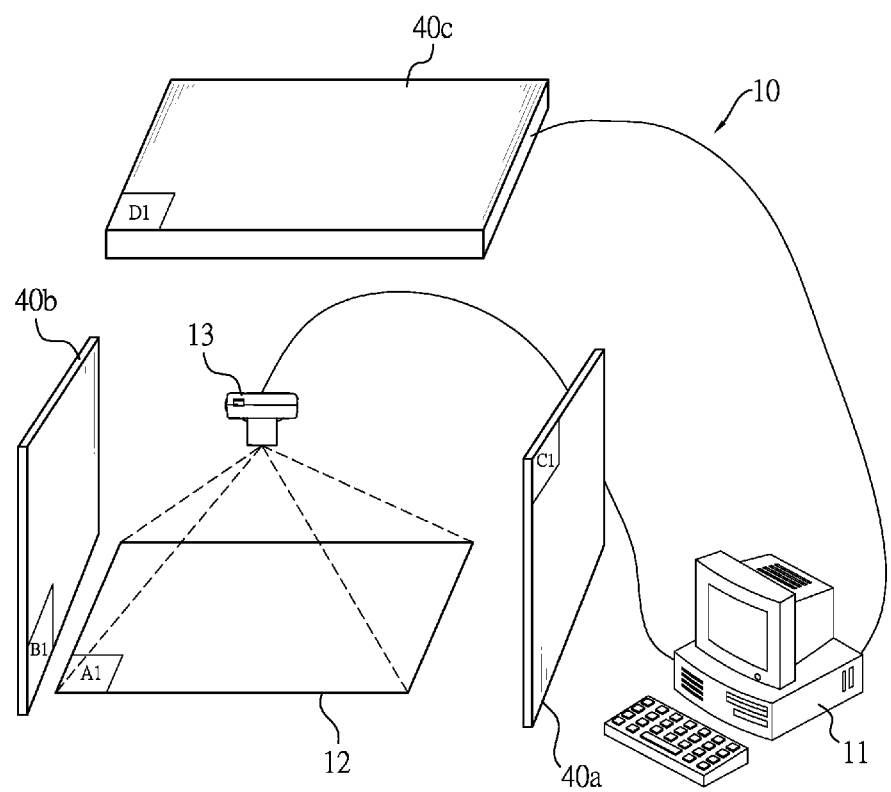
FIG. 3 is a view of an illumination correcting apparatus to correct the at least one light source board in the present invention.

Alternatively, in another embodiment, with reference to FIG. 3, there are a first light source board 40a, a second light source board 40b and a third light source board 40c respectively disposed at a first side, a second side and a third side of the calibrating board 12. The illumination value of the first light source board 40a at the first side is 80 and the distance between the first light source board 40a and the calibrating board 12 is 600 mm. The illumination value of the second light source board 40b at the first side is 120 and the distance between the first light source board 40a and the calibrating board 12 is 500 mm. The illumination value of the third light source board 40c at the first side is 110 and the distance between the first light source board 40a and the calibrating board 12 is 300 mm. The target illumination value for the first light source board 40a, the second light source board 40b and the third light source board 40c is 150. The second light source board 40b at the second side is the target light source board in the present embodiment and the correcting illumination value is: H=120+(150−100)/500*688−((80+(150−100)/600+(110+(150−100)/300))/3.58=1 35. The value 688 is the first constant (Minitial1) and the value 3.58 is the second constant (Minitial2). The first constant and the second constant are obtained by a large number of experiments on the basis of the material and the environment of the first light source board 40a, the second light source board 40b and the third light source board 40c.

Therefore, the illumination value of the light source board 40b at the second side is required to be adjusted from 120 to be 135. Similarly, the target illumination value for the light source board 40a at the first side and the light source board 40c at the third side is further calculated.

Figure 4:
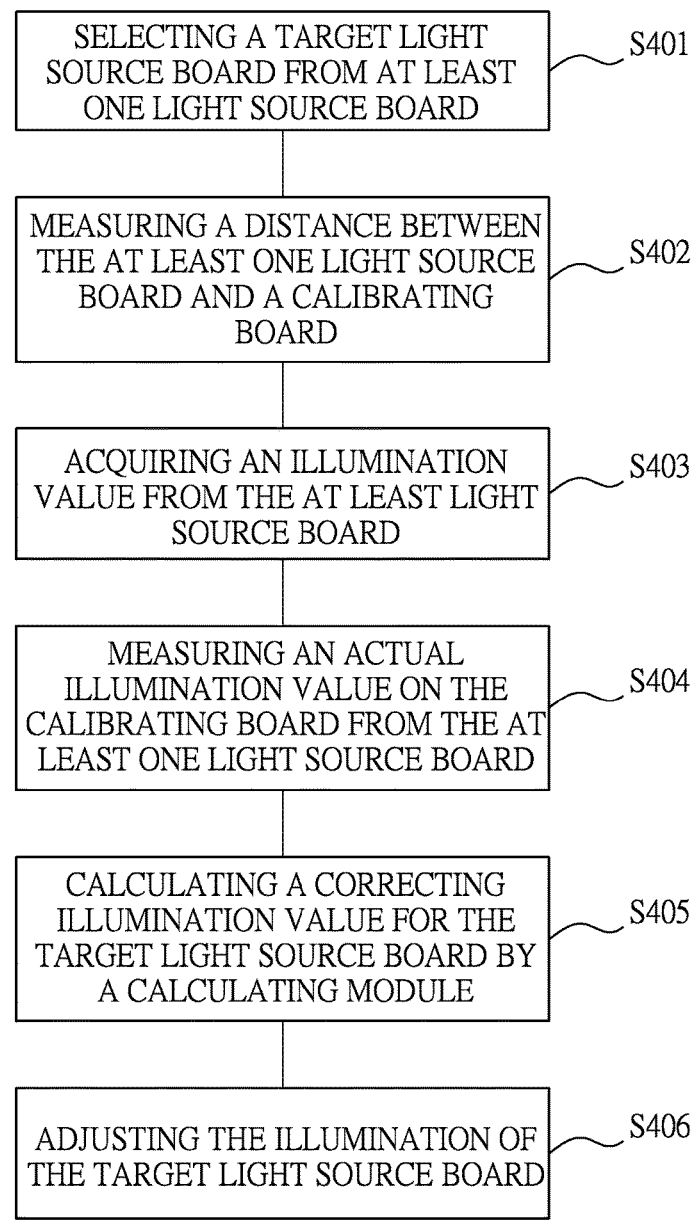
FIG. 4 is a flowchart of an illumination correcting method for the at least one light source board in the present invention.
Figure 5:
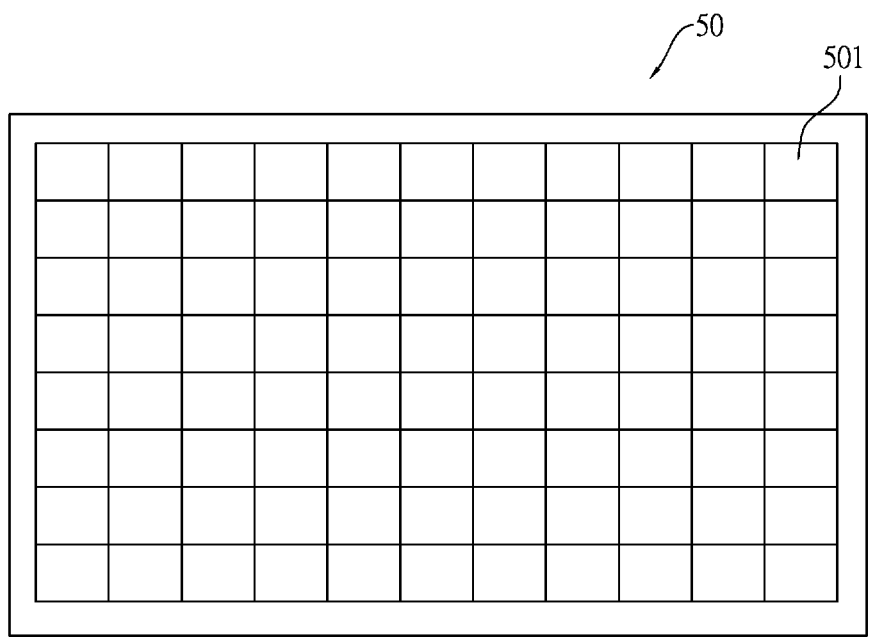
FIG. 5 is a view of a conventional light source board.

With reference to FIG. 4, an illumination correcting method capable of adjusting at least one light source board in the present invention includes the following steps. In step S401, a target light source board is selected from the at least one light source board 20. The target light source board is required to adjust the illumination value. At one embodiment, when the number of the at least one light source board 20 is more than one and the multiple light source boards need adjustment, the correcting method in the present invention will adjust one of the light source boards 20 at one time, and the light source board 20 that is under adjustment is called the target light source board. In different circumstances, different light source boards 20 need different illumination values to be adjusted in the correcting illumination value. The correcting method in the present invention will set the different illumination values for each one of the source boards 20 in accordance with different environments. The correcting method in the present invention adjusts the respective illumination value for each light source board 20 in accordance with the respective distance between each light source board 20 and the calibrating board 12 so as to correct illumination of each light source board 20. For example, when the quantity of the at least one light source board 20 is one, the one light source board 20 is the target light source board. If the number of the at least one light source board 20 is more than one, one of the source boards 20 is selected to be the target light source board and the remaining is/are the regular light source board(s) 20.

In step S402, the distance between each of the at least one light source board 20 and the calibrating board 12 is measured. When the at least one light source board 20 is more than one, they are located at different positions, so the distances between the light source boards 20 and the calibrating board 12 are also different. The illumination strength for different distances is different. Therefore, it is necessary to measure the respective distance between each of the at least one light source board 20 and the calibrating board 12.

In step S403, the main unit 11 acquires the illumination value for each of the at least one light source board 20. Either upon manufacture or after use over time, illuminations generated from the at least one light source board 20 may change. Therefore, the current illumination value of the at least one light source board 20 is required for adjusting the illumination of the at least one light source board 20. Since the at least one light source board 20 is electrically connected to the main unit 11, the main unit 11 controls the at least one light source board 20 to turn on or off. Therefore, the current illumination value(s) of the at least one light source board 20 can be obtained from the main unit 11. Alternatively, in a different embodiment, the user may obtain the current illumination value for each of the at least one light source board 20 from illumination measuring equipment.

In step S404, an actual illumination value emitted on the calibrating board 12 from the at least one light source board 20 is measured by an image capturing device 13. The image capturing device 13 takes a picture of the calibrating board 12 to obtain an image from all of the at least one light source board 20 on the calibrating board 12 and transmits the image to the main unit 11 to perform illumination analysis of the image so as to obtain the actual illumination value.

In step S405, a correcting illumination value for the target light source board is calculated by a calculating module in accordance with a target illumination value, the illumination value, the actual illumination value, and the distance. The target illumination value is an overall illumination value on the calibrating board 12 for the at least one light source board 20. The illumination value and the distance in each of the at least one light source board 20, the actual illumination value on the calibrating board 12, and the target illumination value are inputted in the calculating module 111, and the correcting illumination value for the target light source board is obtained. The calculating module 111 is installed within the main unit 11, and as the calculating algorithm utilized in the calculating module 111 is described above, the description thereof is omitted.

At last, in step S406, the illumination of the target light source board is adjusted in accordance with the correcting illumination value by the main unit 11. If the correcting illumination value is greater than the current illumination value of the target light source board, it represents that the illumination is not bright enough and the illumination value of the at least one light source board 20 should be increased by the main unit 11. Alternatively, if the illumination is too bright, the illumination value of the at least one light source board 20 should be decreased by the main unit 11. The illumination value for each of the at least one light source board 20 is adjusted by the correcting method in the present invention. Finally, all of the at least one light source board 20 is adjusted to have a suitable illumination value. By the aforementioned calculating example, the correcting method in the present invention can be used in the at least one light source board 20. The correcting illumination value for each of the at least one light source board 20 can be calculated sequentially. The at least one light source board 20 is respectively adjusted to have the required illumination value, so the overall illumination as the requirement for the user can be achieved.

With the aforementioned correcting method, it is unnecessary to set parameters. The illumination value and the distance between the at least one light source board and the calibrating board are measured and the overall illumination value on the calibrating board is captured by the image capturing device from all of the at least one light source board. A target light source board is selected and a target illumination value is set. Therefore, the correcting illumination values for all of the at least one light source board are respectively and sequentially calculated so as to achieve the illumination adjustment for the at least one light source board. By comparing to the conventional parameter adjusting method, the steps in the present invention are simplified without wasting much time to perform parameters adjusting.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An illumination correcting apparatus, which is capable of adjusting at least one light source board, comprising:

a main unit electrically connected to the at least one light source board to adjust a respective illumination value of each of the at least one light source board, and including a calculating module that selects one of the at least one light source board as a target light source board and calculates a correcting illumination value for the target light source board in accordance with a target illumination value;

a calibrating board disposed in a light emitting path of the at least one light source board;

an image capturing device opposite the calibrating board and electrically connected to the main unit to capture an image reflected from the at least one light source board to the calibrating board and transmit the image to the main unit, wherein the main unit calculates the correcting illumination value in accordance with an illumination of the image, a respective distance between each of the at least one light source board and the calibrating board, and the target illumination value;

wherein the target illumination value is an overall illumination value from the at least one light source board emitting light to the calibrating board.

2. The illumination correcting apparatus as claimed in claim 1, wherein each of the at least one light source board includes a plurality of light emitting modules and each of the light emitting modules is made of a plurality of light emitting diodes (LEDs).

3. The illumination correcting apparatus as claimed in claim 2, wherein the main unit controls illuminations and colors of the light emitting modules in the at least one light source board.

4. The illumination correcting apparatus as claimed in claim 1, wherein the calculating module calculates the correcting illumination value of the target light source board by a function:

$$H = H1n + \frac{M - Hn}{L1} * Minitial1 - \frac{\left(\left(H2n + \frac{M - Hn}{L2}\right) + \left(H3n + \frac{M - Hn}{L3}\right) + \ldots + \left(Hnn + \frac{M - Hn}{Ln}\right)\right)}{Minitial2}$$

where H is the correcting illumination value of the target light source board;

H1n, H2n, . . . , Hnn are each the respective illumination value of the at least one light source board;

M is the target illumination value;

Hn is an actual illumination value of the image captured by the image capturing device;

L1, L2, . . . , Ln are each the respective distance between the at least one light source board and the calibrating board;

Minitial1 is a first constant;

Minitial2 is a second constant.

5. An illumination correcting method, which is capable of adjusting at least one light source board; comprising steps of:

selecting one of the at least one light source board as a target light source board;

measuring a respective distance between each of the at least one light source board and a calibrating board;

acquiring a respective illumination value from each of the at least light source board via a main unit;

measuring an actual illumination value on the calibrating board from the at least one light source board via an image capturing device;

calculating a correcting illumination value for the target light source board by a calculating module in accordance with a target illumination value, the illumination value, the actual illumination value, and the distance;

wherein the target illumination value is an overall illumination value required on the calibrating board from the at least one light source board.

6. The illumination correcting method as claimed in claim 5, wherein the step of calculating the correcting illumination value for the target light source board by the calculating module in accordance with the target illumination value, the illumination values, the actual illumination value, and the distance implements a function:

$$H = H1n + \frac{M - Hn}{L1} * Minitial1 - \frac{\left(\left(H2n + \frac{M - Hn}{L2}\right) + \left(H3n + \frac{M - Hn}{L3}\right) + \ldots + \left(Hnn + \frac{M - Hn}{Ln}\right)\right)}{Minitial2}$$

where H is the correcting illumination value of the target light source board;

H1n, H2n, . . . , Hnn are each the respective illumination value for the at least one light source board;

M is the target illumination value;

Hn is the actual illumination value of the image captured by the image capturing device;

L1, L2, . . . , Ln are each the respective distance between the at least one light source board and the calibrating board;

Minitial1 is a first constant;

Minitial2 is a second constant.

7. The illumination correcting method as claimed in claim 6, wherein the calculating module is installed within the main unit.

* * * * *